US012509855B2

(12) United States Patent
Sasaki et al.

(10) Patent No.: US 12,509,855 B2
(45) Date of Patent: Dec. 30, 2025

(54) REMOTE CONTROL SYSTEM FOR CONSTRUCTION MACHINE

(71) Applicant: KOBELCO CONSTRUCTION MACHINERY CO., LTD., Hiroshima (JP)

(72) Inventors: Hitoshi Sasaki, Hiroshima (JP); Seiji Saiki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 313 days.

(21) Appl. No.: 17/779,254

(22) PCT Filed: Aug. 7, 2020

(86) PCT No.: PCT/JP2020/030372
§ 371 (c)(1),
(2) Date: May 24, 2022

(87) PCT Pub. No.: WO2021/131136
PCT Pub. Date: Jul. 1, 2021

(65) Prior Publication Data
US 2022/0403619 A1    Dec. 22, 2022

(30) Foreign Application Priority Data
Dec. 26, 2019    (JP) .................................. 2019-235415

(51) Int. Cl.
*E02F 9/20*    (2006.01)
*E02F 9/26*    (2006.01)

(52) U.S. Cl.
CPC .............. *E02F 9/205* (2013.01); *E02F 9/261* (2013.01)

(58) Field of Classification Search
CPC ......... E02F 9/205; E02F 9/261; E02F 9/2054; E02F 9/264; G06Q 10/06; G06Q 50/08; G08C 17/02; H04N 7/181
See application file for complete search history.

(56) References Cited

U.S. PATENT DOCUMENTS

| 2002/0059320 A1* | 5/2002 | Tamaru .................... E01C 19/00 |
| 2015/0163212 A1* | 6/2015 | Saegusa ................. G07C 5/008 726/28 |

(Continued)

FOREIGN PATENT DOCUMENTS

| JP | H109-244745 A | 9/1997 |
| JP | 2010-248703 A | 11/2010 |

(Continued)

OTHER PUBLICATIONS

Machine translation of cited reference KR20180091137 description. (Year: 2018).*

(Continued)

*Primary Examiner* — Erin M Piateski
*Assistant Examiner* — Shelley Marie Osterhout
(74) *Attorney, Agent, or Firm* — Carrier, Shende & Associates P.C.; Joseph P. Carrier; Jeffrey T. Gedeon

(57) ABSTRACT

A remote control system 1 comprises a server 50 configured to acquire, for each of a plurality of construction machines 10, information indicating whether a predetermined event related to a machine control request timing which is a timing at which control of each of the plurality of construction machines 10 is to be started has occurred, and reporting devices 44, 45 configured to output report information to an operator according to an instruction from the server 50. With respect to any one of the plurality of construction machines 10, the server 50 is configured to, when acquiring information indicating occurrence of the predetermined event associated with the construction machine, output report infor- (Continued)

mation indicating the occurrence from the reporting devices 44, 45.

3 Claims, 3 Drawing Sheets

(56) References Cited

U.S. PATENT DOCUMENTS

| | | | |
|---|---|---|---|
| 2017/0322550 A1* | 11/2017 | Yokoyama | G05D 1/0022 |
| 2017/0328030 A1* | 11/2017 | Yamada | E02F 9/205 |
| 2018/0334136 A1* | 11/2018 | Chaston | G06V 20/56 |
| 2018/0334979 A1* | 11/2018 | Watson | F02N 11/0807 |
| 2018/0341901 A1 | 11/2018 | Shike | |
| 2020/0057436 A1* | 2/2020 | Boda | G08G 1/09 |
| 2020/0399863 A1* | 12/2020 | Aizawa | B60R 11/02 |

FOREIGN PATENT DOCUMENTS

| | | | |
|---|---|---|---|
| JP | 2018-021395 A | | 2/2018 |
| JP | 2019021200 A | * | 2/2019 |
| JP | 2019-047442 A | | 3/2019 |
| JP | 2019-167732 A | | 10/2019 |
| KR | 20180091137 A | * | 8/2018 |

OTHER PUBLICATIONS

EPO machine translated description for reference JP-2019021200-A. (Year: 2019).*

The extended European search report dated Dec. 16, 2022 issued in the corresponding EP Patent Application No. 20906934.3.

* cited by examiner

REMOTE CONTROL SYSTEM FOR CONSTRUCTION MACHINE

TECHNICAL FIELD

The present invention relates to a system that allows an operator to remotely control a plurality of construction machines.

BACKGROUND ART

Systems for remotely controlling a construction machine such as a hydraulic excavator, which are disclosed in, for example, Patent Literatures 1 and 2, are known in the related art. In these systems, an operator operates a machine control device that can wirelessly transmit a control signal to a construction machine to thereby remotely control the construction machine.

CITATION LIST

Patent Literature

Patent Literature 1: Japanese Patent Laid-Open No. 2019-047442

Patent Literature 2: Japanese Patent Laid-Open No. 2018-021395

SUMMARY OF INVENTION

Technical Problem

At present, the present applicant has been investigating construction of a system that allows one operator to selectively control a plurality of construction machines placed at one or a plurality of work sites by operating a machine control device for the operator.

In this case, the operator needs to appropriately recognize a timing at which control of each construction machine to be controlled is be started, and perform an operation of switching the construction machines to be controlled, at the timing. The switching operation may include an operation of stopping the drive of the construction machine that has been operated before the switching, an operation of activating the construction machine to be controlled after switching, and the operation of switching a communication connection between the machine control device for the operator and the construction machine to be controlled.

If the timing at the control of each construction machine to be controlled is to be started is delayed, it causes a delay in progress of operation at the work site for the construction machine whose control has been newly started. Otherwise, if the timing at the control of each construction machine to be controlled is to be started is too early, the actual work by the construction machine whose control is newly started cannot be performed immediately, and therefore a situation is so likely to occur that it is necessary to wait until the actual work can be started. This causes reduction in operation efficiency of the operator.

Accordingly, it is desirable that the operator can appropriately recognize the timing at which the control of each construction machine to be controlled is to be started.

Here, in the case where the timing at which the control of each of the construction machines to be controlled by the operator is to be started is set to a predetermined time point in advance, the operator can recognize the timing at which the control of each construction machine is to be started on the basis of the time point.

In fact, the timing at the control of each construction machine is to be started generally varies according to the progress status of the work at the work site for each construction machine. For example, a loading work for loading earth, sand or the like onto a dump truck is performed after the dump truck arrives at the work site, but in general the dump truck often does not arrive at the time point predefined in the schedule.

The present invention has been made in view of the background described above, and an object of the present invention is to provide a remote control system that allows an operator that selectively and remotely controls a plurality of construction machines to easily and appropriately recognize a timing at which control of each construction machine is to be started, and that can enhance the operation efficiency.

Solution to Problem

A remote control system for a construction machine of the present invention is a remote control system configured to allow an operator to selectively and remotely control a plurality of construction machines to be controlled according to an operation of a machine control device operable by an operator to achieve the above-described object, the remote control system comprising a server configured to acquire, for each of the plurality of construction machines, information indicating whether an event associated with each construction machine has occurred as a predetermined event related to a machine control request timing which is a timing at which control of each of the plurality of construction machines is to be started, and reporting devices configured to output report information to the operator according to an instruction from the server, wherein with respect to any one of the plurality of construction machines, the server is configured to, when acquiring information indicating occurrence of the predetermined event associated with the construction machine, output report information indicating the occurrence from the reporting devices.

DESCRIPTION OF EMBODIMENTS

Figure 1:
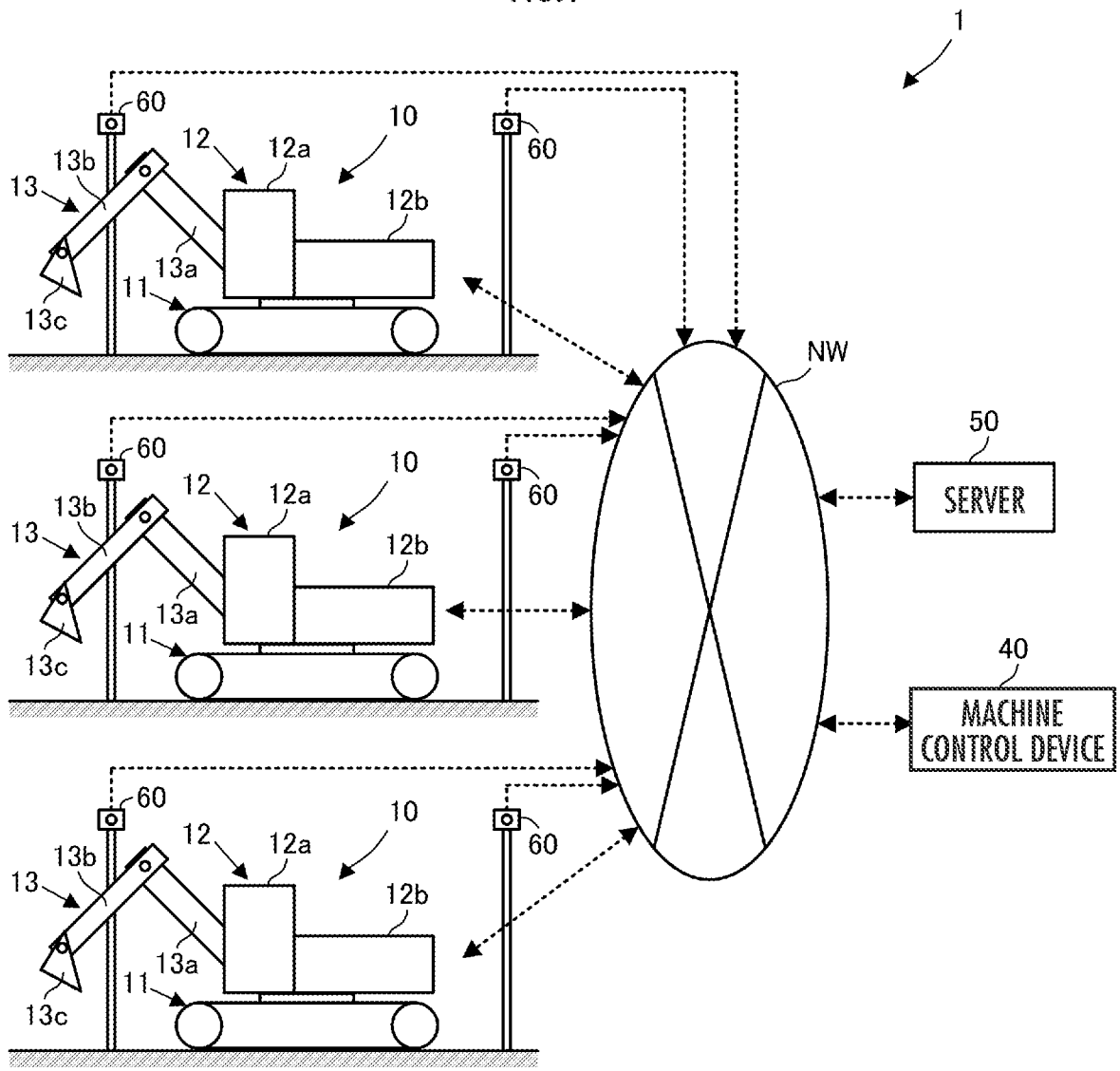
FIG. 1 is a diagram schematically illustrating an overall configuration of a remote control system of an embodiment of the present invention.

Hereinafter, an embodiment of the present invention will be described with reference to FIGS. 1 to 3. Referring to FIG. 1, a remote control system 1 for a construction machine of the present embodiment is a system configured to allow an operator to selectively and remotely control each of a plurality of construction machines 10 by operating a machine control device 40, the construction machines 10 being allocated to the operator or the machine control device 40 as construction machines to be controlled.

The remote control system 1 includes, in addition to the machine control device 40 and the construction machines 10, a server 50 configured to perform various processing such as administration processing and information processing related to the remote control system 1, and a plurality of cameras 60 (hereinafter, referred to as on-site installation cameras 60) installed at work sites where the respective construction machines 10 are to be placed.

Each construction machine 10, the machine control device 40, and the server 50 can communicate with one another through a network NW including a radio communication network. The machine control device 40 and the server 50 can appropriately acquire images captured by the on-site installation cameras 60 through the network NW. Note that the plurality of construction machines 10 to be controlled by the machine control device 40 may be placed either at one work site or at a plurality of work sites.

As each construction machine 10, a hydraulic excavator may be adopted, for example. In this case, each construction machine 10 comprises a crawler type (or a wheel type) traveling body 11, a swivel body 12 swivelably mounted on the traveling body 11, and a work device 13 attached to a front portion of the swivel body 12, in the same manner as the well-known hydraulic excavator. The swivel body 12 has an operator cab 12a at a front portion thereof, and has a machine room 12b that houses an engine 22, a hydraulic circuit device 21, and the like, which will be described later, at a rear portion thereof. The work device 13 has a boom 13a, an arm 13b, and an attachment 13c (e.g., a bucket).

Figure 2:
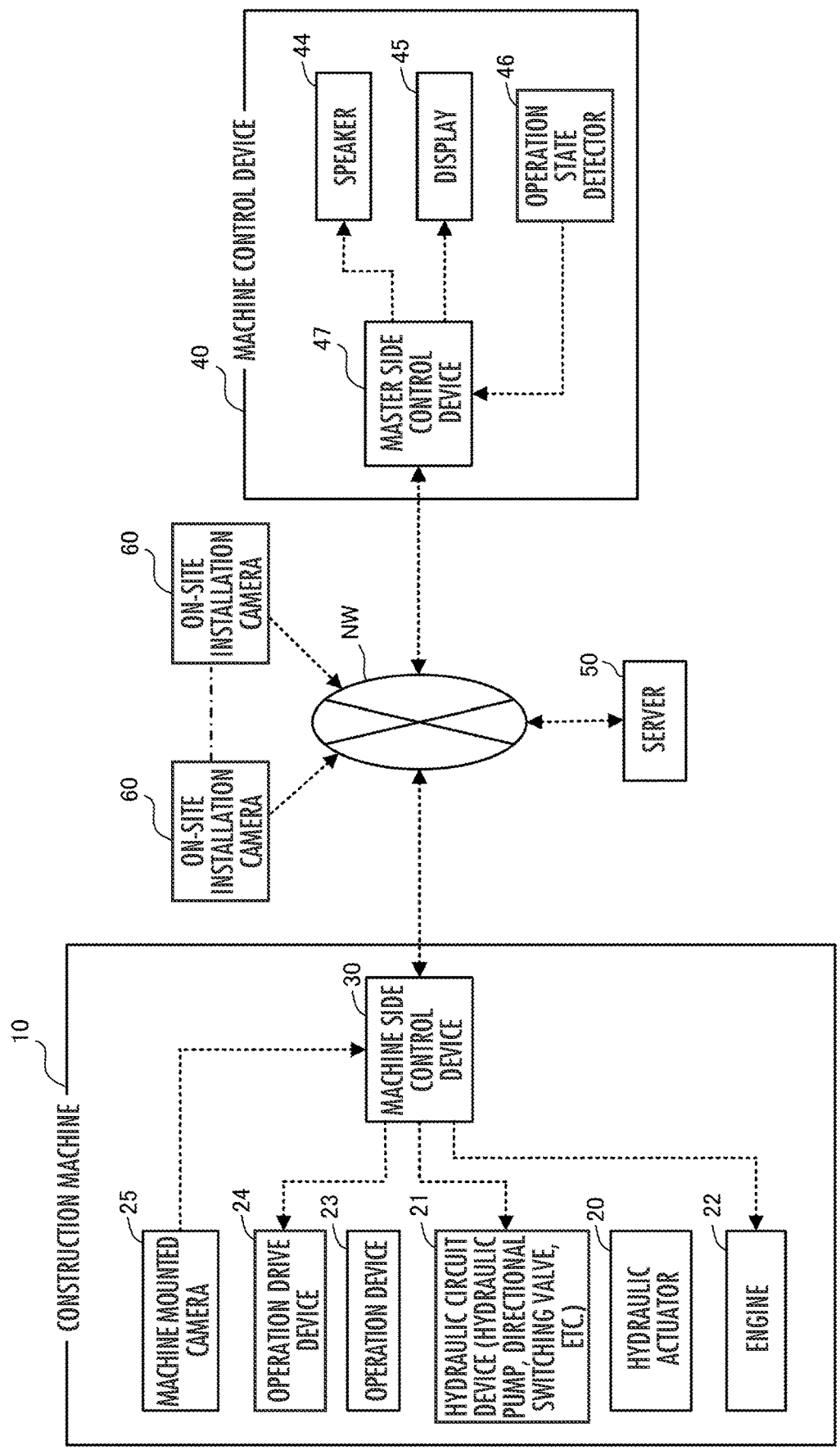
FIG. 2 is a block diagram illustrating a configuration associated with control processing of the remote control system of the embodiment.

Although not illustrated in detail, each construction machine 10 comprises, as illustrated in FIG. 2, a plurality of hydraulic actuators 20, the hydraulic circuit device 21 including a hydraulic pump, a directional switching valve, and the like, which are not illustrated, for supplying hydraulic oil to each hydraulic actuator 20, the engine 22 that drives the hydraulic pump of the hydraulic circuit device 21, an operation device 23 for operating an action of each hydraulic actuator 20, an electrically powered operation drive device 24 that drives the operation device 23, a plurality of cameras 25 (hereinafter, referred to as machine mounted cameras 25) mounted on the swivel body 12 and the like so as to capture images of conditions around the construction machine 10 (including the front side of the operator cab 12a), and a control device 30 (hereinafter, referred to as a machine side control device 30) having a function of performing the drive control of the construction machine 10. Note that FIG. 2 typically illustrates only one of the hydraulic actuators 20 and only one of the machine mounted cameras 25.

The hydraulic actuator 20 includes a hydraulic motor for traveling that is driven to travel the traveling body 11, a hydraulic motor for swiveling that is driven to swivel the swivel body 12, and hydraulic cylinders that drive the boom 13a, the arm 13b and the attachment 13c of the work device 13, respectively.

The operation device 23 includes operation levers, operation pedals, operation switches, and the like that are arranged in the operator cab 12a. The operation drive device 24 has, for example, a plurality of electric motors, and is configured such that the operation levers or the operation pedals included in the operation device 23 can be driven by the electric motors via an appropriate power transmitter.

The machine side control device 30 is composed of one or more electronic circuit units that include, for example, microcomputers, memories (RAM, ROM, and the like), interface circuits, wireless communication devices and the like. The machine side control device 30 has, as functions implemented by one or both of hardware configuration and a program (software configuration) that have been installed, a function of acquiring images captured by the machine mounted cameras 25, a function of communicating, through the network NW, with each of a master side control device 47, which will be described later, of the machine control device 40 and the server 50, and a function of performing the drive control of the construction machine 10 through the operation control of each of an electric valve (an electromagnetic proportional valve or the like) included in the hydraulic circuit device 21, the engine 22 and the operation drive device 24.

In this case, the machine side control device 30 communicates with the master side control device 47 or the server 50, which makes it possible to receive an actuation instruction of the construction machine 10 and transmit images captured by the machine mounted cameras 25 and information indicating an operation state of the construction machine 10 to the master side control device 47 or the server 50. Supplementally, the plurality of construction machines 10 to be controlled by the machine control device 40 are not limited to the construction machines of the same model, and may be construction machines of a plurality of types that are different from one another in terms of specifications such as size and capability.

Figure 3:
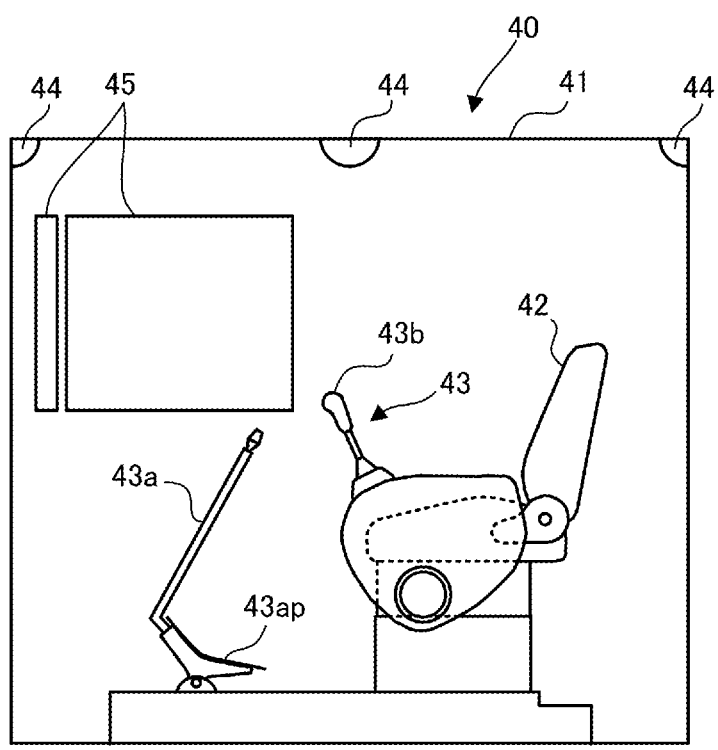
FIG. 3 is a diagram illustrating a configuration of a machine control device illustrated in FIG. 1.

As illustrated in FIG. 3, the machine control device 40 comprises, in a remote control room 41, a seat 42 on which an operator sits, an operation device 43 operated by the operator to perform remote control of the construction machine 10, speakers 44 as output devices of acoustic information (auditory information), and a display 45 as an output device of display information (visual information).

The operation device 43 can adopt a configuration that is the same as or similar to that of, for example, the operation device 23 of the construction machine 10.

For example, the operation device 43 illustrated in FIG. 3 includes an operation lever 43a with an operation pedal 43ap placed in front of the seat 42 and an operation lever 43b placed on each of both left and right sides of the seat 42, so that an operator seated on the seat 42 can operate. However, the operation device 43 may have a different configuration from the operation device 23 of the construction machine 10. For example, the operation device 43 may be a portable operation device having a joystick, an operation button, or the like.

The speakers 44 are installed at a plurality of locations of the remote control room 41 (e.g., at the front, the rear, and both left and right sides of the remote control room 41). The display 45 is composed of, for example, a liquid crystal display, a head-up display, or the like, and is installed in the remote control room 41 such that the display 45 can be seen by an operator seated on the seat 42. In the present embodiment, the speakers 44 and the display 45 can function as reporting devices in the present invention.

Furthermore, as illustrated in FIG. 2, the machine control device 40 comprises an operation state detector 46 for detecting an operation state of the operation device 43, and the master side control device 47 having a function of executing control processing related to the machine control device 40. Note that the master side control device 47 may be placed at either the inside or the outside of the remote control room 41.

The operation state detector 46 includes, for example, a potentiometer, a contact switch, and the like incorporated in the operation device 43, and is configured to output a detection signal indicating the operation state of each of the operation parts (the operation levers 43a, 43b, the operation pedal 43ap, and the like) of the operation device 43.

The master side control device 47 is composed of one or more electronic circuit units that include, for example, microcomputers, memories (RAM, ROM, and the like), interface circuits, communication devices and the like. The master side control device 47 has, as functions implemented by one or both of hardware configuration and a program (software configuration) that have been installed, a function of acquiring detection signals of the operation state detector 46, a function of acquiring, through the network NW, images captured by the on-site installation cameras 60 at work sites where each construction machine 10 to be controlled is located, a function of communicating, through the network NW, with each of the machine side control device 30 of each construction machine 10 to be controlled and the server 50, and a function of performing the operation control of the speakers 44 and the display control of the display 45.

In this case, the master side control device 47 communicates with the machine side control device 30 of each construction machine 10, which makes it possible to acquire, from the machine side control device 30, the images captured by the machine mounted cameras 25 of the construction machine 10 and the information indicating the operation state of the construction machine 10 and transmit, to the machine side control device 30, the actuation instruction of the construction machine 10 generated according to the operation state of the operation device 43. The master side control device 47 communicates with the server 50, which makes it possible to acquire, from the server 50, various information and instructions about the remote control of each construction machine 10.

The server 50 is composed of one or more electronic circuit units that include, for example, one or more computers, microcomputers, or the like, or a combination thereof.

The server 50 has, as functions implemented by one or both of hardware configuration and a program (software configuration) that have been installed, a function of acquiring, through the network NW, images captured by the on-site installation cameras 60, and a function of communicating, through the network NW, with each of the machine side control device 30 of each construction machine 10 and the master side control device 47 of the machine control device 40.

Furthermore, the server 50 can also communicate with a communication terminal (e g., a smartphone, a tablet terminal, a personal computer, or the like), which is not illustrated, that can be operated by an operator of the machine control device 40, and a communication terminal (e g., a smartphone, a tablet terminal, a personal computer, or the like), which is not illustrated, that can be operated by a supervisor or the like at a work site where each construction machine 10 is placed.

The server 50 communicates with the machine side control device 30 of each construction machine 10, which makes it possible to acquire, from the machine side control device 30, the images captured by the machine mounted cameras 25 of the construction machine 10 and the information indicating the operation state of the construction machine 10, and transmit, to the machine side control device 30, the actuation instruction such as an activation instruction (an instruction to turn on a main switch of the construction machine 10 or an instruction to start the engine 22) or the like of the construction machine 10.

The server 50 communicates with the master side control device 47 of the machine control device 40, which makes it possible to acquire, from the master side control device 47, the information indicating the operation state of the machine control device 40, and transmit, to the master side control device 47, various information and instructions about the remote control of the construction machine 10.

Information indicating operation schedules of each construction machine 10 and the machine control device 40 and information indicating the content of an event related to a machine control request timing which is a timing at which the control of each construction machine 10 is to be started by the machine control device 40 are registered with the server 50 in advance (before the execution of the remote control of each construction machine 10 by the machine control device 40). The event refers to one or more events which may occur in the period immediately before the control of each construction machine 10 is started by the machine control device 40. Hereinafter, such an event is referred to as an event immediately before machine control start.

In the present embodiment, an operator of the machine control device 40 or a relevant person (e.g., a supervisor at the work site of the construction machine 10) can register (set) a desired event immediately before machine control start for each construction machine 10 to be remotely controlled, with (to) the server 50 via the communication terminal. In this case, a level of urgency at which the control of the construction machine 10 is to be started according to the occurrence of the event immediately before machine control start may be added to the event immediately before machine control start.

The server 50 further has a function of detecting the presence or absence of occurrence of the event registered for each construction machine 10 on the basis of the images captured by the on-site installation camera 60 or the machine mounted cameras 25 of each construction machine 10, information input to the server 50 by a supervisor at the work site of each construction machine 10 according to the progress of the work, or time point information.

Next, the operation in the case where an operator performs remote control of a plurality of construction machines 10 using the machine control device 40 will be specifically described. Before performing the remote control of the plurality of construction machines 10, an operator or a relevant person (hereinafter, generally referred to as an on-site related person) uses an operable communication terminal (not illustrated) to set (register) the event immediately before machine control start for each construction machine 10 to be remotely controlled, to (with) the server 50 in advance.

In this case, the server 50 holds a database on the type of the recognizable event immediately before machine control start. The on-site related person selects, from the above-described database, a desired event immediately before machine control start (one or a plurality of events immediately before machine control start) for each construction machine 10 in light of work contents to be performed by each construction machine 10 to be controlled, a situation in the work site and the like, and sets the selected event immediately before machine control start to the server 50. In this case, the server 50 may present, to the on-site related person, candidates of a plurality of events immediately before machine control start suitable for work contents in light of the work contents to be performed by each construction machine 10 to be controlled.

More specifically, in the case where a work to be performed by the construction machine 10 to be remotely controlled is, for example, a loading work for loading earth, sand or the like onto a truck, the on-site related person selects, as an event immediately before machine control start, an event that the truck newly arrives at the work site, an event that the truck approaches a location within a predetermined distance from the construction machine 10 to be controlled, an event that a specific worker present at the work site issues a predetermined signal to the construction machine 10 to be controlled, an event that a supervisor or the like at the work site performs a predetermined input operation to the server 50 (e.g., an input operation to permit the start of work by the construction machine 10 to be controlled), a combination of a plurality of events among these events, or a combination of these events and a time point zone (a time point zone such as morning, afternoon, or 13:00 to 14:00), and sets (registers) the selected event to (with) the server 50.

Note that in the case where a start time point of the work by the construction machine 10 to be controlled is previously determined, an event that an actual time point reaches a time point ahead of the start time point by a predetermined period of time (e.g., before 5 minutes) can be set as the event immediately before machine control start, for example.

In the present embodiment, the on-site related person can further add, to the event immediately before machine control start, a level of urgency of starting the control of the construction machine 10 according to the occurrence of the event immediately before machine control start which is set to the server 50.

More specifically, in the case where the work to be performed by the construction machine 10 to be controlled is, for example, a loading work for loading earth, sand or the like onto a truck, an event that the truck newly arrives at the work site can be set to the server 50 as the event immediately before machine control start with a low level of urgency of the machine control start or an event that the truck approaches a location within a predetermined distance from the construction machine 10 to be controlled can be set to the server 50 as the event immediately before machine control start with a high level of urgency of the machine control start.

In addition, a plurality of events which may occur in a time interval (at a time interval) can be set to the server 50 as respective events immediately before machine control start, and levels of urgency different from one another can be added to the respective events immediately before machine control start. In the case where the work to be performed by the construction machine 10 to be controlled is, for example, a loading work for loading earth, sand or the like onto a truck, an event that the truck newly arrives at the work site and an event that the truck approaches a location within a predetermined distance from the construction machine 10 to be controlled can be set to the server 50 as the event immediately before machine control start with a low level of urgency and the event immediately before machine control start with a high level of urgency, respectively.

Supplementally, the server 50 can be configured to automatically set an event immediately before machine control start and a level of urgency corresponding to the event immediately before machine control start according to the type of work content to be performed by the construction machine 10 to be controlled or the work schedule.

As described above, after the event immediately before machine control start is set to (registered with) the server 50 for each construction machine 10 to be controlled, the server 50 detects, for each construction machine 10, whether the event immediately before machine control start has occurred on the day when the work is performed by each construction machine 10 to be controlled. In this case, in the case where the event immediately before machine control start is an event which can be recognized from the images captured by the on-site installation camera 60 at the work site of each construction machine 10 or the images captured by the machine mounted cameras 25 of each construction machine 10 (including construction machines other than the construction machines 10 to be controlled) located at the work site, the server 50 detects the presence or absence of occurrence of the event immediately before machine control start on the basis of these captured images, while acquiring the captured images.

In the case where the event immediately before machine control start is, for example, an event that the truck newly arrives at the work site, the server 50 can detect the presence or absence of occurrence of the event immediately before machine control start on the basis of the images captured by the on-site installation camera 60 that can capture images of an entrance of the work site or the machine mounted cameras 25.

Alternatively, in the case where the event immediately before machine control start is, for example, an event that the truck approaches a location within a predetermined distance from the construction machine 10 to be controlled or an event that a specific worker present at the work site issues a predetermined signal to the construction machine 10 to be controlled, the server 50 can detect the presence or absence of occurrence of the event immediately before machine control start on the basis of the images captured by the on-site installation camera 60 that can capture images of the periphery of the construction machine 10 to be controlled or the machine mounted cameras 25.

Note that in the case where the event immediately before machine control start is an event that a supervisor or the like at the work site performs an input operation to the server 50 or an event defined by a time point, the server 50 can detect the presence or absence of occurrence of the event immediately before machine control start without the need for captured images. Supplementally, it may be configured that the presence of absence of occurrence of the event immediately before machine control start is detected by a device other than the server 50 and the server 50 acquires the information indicating the detection results.

When the server 50 detects the occurrence of the event immediately before machine control start (or acquires the information indicating the detection) with respect to any one of the construction machines 10 to be controlled, the server 50 instructs the master side control device 47 of the machine control device 40 to output, to the operator, report information (hereinafter, referred to as an event occurrence report information) indicating that the event immediately before machine control start has occurred.

Furthermore, in the case where the level of urgency is added to the event immediately before machine control start that has occurred, the server 50 also transmits, to the master side control device 47, the information indicating the level of urgency. In the case where the level of urgency is set to a "high" level of urgency, the server 50 transmits, to the machine side control device 30 of the construction machine 10 whose control is to be started according to the occurrence of the event immediately before machine control start, an instruction to execute activation processing of the construction machine 10, e.g., to turn on a main switch of the construction machine 10 (a switch for powering on a main device of the construction machine 10), and an instruction to execute start processing of the engine 22.

At this time, the master side control device 47 that has received the instruction to output the event occurrence report information controls one or both of the speakers 44 and the display 45 to perform one or both of outputting the event occurrence report information by voice or the like from the speaker 44 and displaying the event occurrence report information on the display 45. This enables the server 50 to output the event occurrence report information from one or both of the speakers 44 and the display 45 via the master side control device 47.

Furthermore, in this cause, in the case where the level of urgency is added to the event immediately before machine control start, the master side control device 47 outputs the event occurrence report information from one or both of the speakers 44 and the display 45 in an output form according to the level of urgency.

For example, the master side control device 47 controls the speakers 44 such that the higher the level of urgency is, the larger the volume of the voice or alarm sound (the voice or alarm sound indicating the occurrence of the event immediately before machine control start) to be output from the speakers 44 is. Alternatively, the master side control device 47 controls the display 45 such that the higher the level of urgency is, the higher the luminance or chroma of the information (the information indicating the occurrence of the event immediately before machine control start) to be displayed on the display 45 is or such that the display color of the information becomes more conspicuous. In the case where a vibrator is incorporated in the seat 42 of the machine control device 40, the vibration intensity of the seat 42 may increase as the level of urgency increases.

The machine side control device 30 that has received the instruction to execute the start processing of the engine 22 turns on the main switch of the construction machine 10 and starts the engine 22 of the construction machine 10. This enables the server 50 to automatically start the engine 22 of the construction machine 10 to be controlled, via the machine side control device 30.

As described above, upon receiving the event occurrence report information, the operator of the machine control device 40 can recognize that it is a timing at which the remote control of the construction machine 10 is to be started shortly, the construction machine 10 corresponding to the event immediately before machine control start which is indicated by the event occurrence report information, even while another construction machine 10 is operating under remote control. At this time, the event occurrence report information is reported in the output form according to the level of urgency, and therefore the operator can appropriately recognize the level of urgency of starting the remote control of the construction machine 10.

Accordingly, the operator can switch the construction machines 10 to be controlled at appropriate timing to start the remote control of the new construction machine 10. In addition, the operation efficiency of the operator by remote control can be enhanced. In the case where the level of urgency is set to a "high" level of urgency, the engine 22 of the construction machine 10 whose control to be newly started is automatically started according to the instruction transmitted from the server 50 to the machine side control device 30, and therefore the operator can promptly start the remote control operation of the construction machine 10.

Note that the present invention is not limited to the above embodiment, but can adopt other embodiments. Several other embodiments will be described below.

In the above-described embodiment, on the necessary condition that the level of urgency associated with the event immediately before machine control start is high, the machine side control device 30 of the construction machine 10 whose control is to be newly started is configured to automatically start the engine 22 of the construction machine 10 according to the instruction from the server 50, but may be configured to automatically start the engine 22 of the construction machine 10 regardless of the level of urgency. Alternatively, in the case where the level of urgency is low, it may be configured that the machine side control device 30 executes, as the activation processing of the construction machine 10, processing of turning on the main switch of the construction machine 10 without starting the engine 22 of the construction machine 10, for example. In this manner, the start processing of the engine of the construction machine 10 is not automatically executed with respect to the event immediately before machine control start with low level of urgency, which makes it possible to reduce the fuel consumption of the engine of the construction machine 10.

In the above-described embodiment, the on-site installation camera 60 or the machine mounted cameras 25 are used as the camera located at the work site of the construction machine 10 to be controlled, but a camera mounted on a remote control aerial vehicle such as a drone which can fly appropriately at the work site, for example, can be used as the camera to be located at the work site.

In the above-described embodiment, the speakers 44 and the display 45 that are provided in the machine control device 40 are exemplified as the reporting devices, but the reporting device may be, for example, a portable communication terminal such as a smartphone or a tablet terminal that is held by the operator.

In the above-described embodiment, a hydraulic excavator is exemplified as the construction machine, but the construction machine in the remote control device of the present invention is not limited to the hydraulic excavator, and may be a construction machine such as a crane.

As described above, a remote control system for a construction machine of the present invention is a remote control system configured to allow an operator to selectively and remotely control a plurality of construction machines to be controlled according to an operation of a machine control device operable by an operator, comprising a server configured to acquire, for each of the plurality of construction machines, information indicating whether an event associated with each construction machine has occurred as a predetermined event related to a machine control request timing which is a timing at which control of each of the plurality of construction machines is to be started, and reporting devices configured to output report information to the operator according to an instruction from the server, wherein with respect to any one of the plurality of construction machines, the server is configured to, when acquiring information indicating occurrence of the predetermined event associated with the construction machine, output report information indicating the occurrence from the reporting devices (first invention).

Note that in the present invention, the "predetermined event related to a machine control request timing" means an event which may occur in a period immediately before the machine control request timing (the timing at which machine control is to be started).

According to the above-described first invention, when the predetermined event associated with each construction machine occurs, the report information indicating the occurrence is reported to the operator. Therefore, the operator can easily recognize that the timing (machine control request timing) at which the control of the construction machine corresponding to the event is to be started is approaching. Accordingly, the operator can easily and appropriately recognize the timing at which the control of each construction machine to be controlled is to be started.

Accordingly, according to the first invention, the operator that selectively and remotely controls the plurality of construction machines can easily and appropriately recognize the timing at which the control of each construction machine is to be started, and the operation efficiency can be enhanced.

In the above-described first invention, the predetermined event associated with each of the construction machines preferably refers to one or more events set previously for each of the construction machines by the operator or a relevant person (second invention).

With this configuration, the operator or the relevant person (e.g., a supervisor at the work site) can set one or more predetermined events appropriately. In this case, in the case where the operator sets the predetermined events, the operator can set the events that are easy to understand for himself/herself. In the case where the relevant person such as a supervisor at the work site sets the predetermined events, the operator can set the events that are easy to understand for himself/herself in light of a situation in the work site.

In the above-described first invention or second invention, with respect to any one of the plurality of construction machines, the server may be configured to further have a function of, when acquiring information indicating occurrence of the predetermined event associated with the construction machine, executing activation processing of the construction machine associated with the event (third invention).

With this configuration, the activation processing of the construction machine is automatically executed by the server, and therefore the operator can promptly start the control of the construction machine to be newly controlled. Note that the above-described "activation processing" may include, for example, processing of starting the engine of the construction machine. However, the "activation processing" may be, for example, processing of turning on the power source of the main electronic device of the construction machine.

In the above-described first invention or second invention, a level of urgency of a machine control start of a corresponding construction machine is set to the predetermined event associated with each of the construction machines, and with respect to any one of the plurality of construction machines, the server may be configured to further have a function of, when acquiring information indicating occurrence of the predetermined event associated with the construction machine, executing start processing of an engine of the construction machine associated with the event on a necessary condition that the level of urgency set to the event is high (fourth invention).

With this configuration, in the case where the level of urgency set to the predetermined event is high, i.e., in the case where the necessity for promptly starting the control of the construction machine associated with the event according to the occurrence of the event is high, the engine of the construction machine is automatically started. This enables the operator to rapidly start the remote control operation of the construction machine. In the case where the level of urgency set to the predetermined event is low, the start processing of the engine of the construction machine corresponding to the event is not automatically executed, which makes it possible to reduce the fuel consumption of the engine of the construction machine.

In the above-described first to fourth inventions, in the case where a level of urgency of a machine control start of a corresponding construction machine is set to the predetermined event associated with each of the construction machines, with respect to any one of the plurality of construction machines, the server is preferably configured to, when acquiring information indicating occurrence of the predetermined event associated with the construction machine, vary an output form of the report information from the reporting devices according to the level of urgency set to the event (fifth invention).

With this configuration, the output form of the report information to be output to the operator varies according to the level of urgency set to the predetermined event, and therefore the operator can distinguish and recognize whether the control of the construction machine corresponding to the event that has occurred is to be immediately started or there is time allowance for starting the machine control.

In the above-described first to fifth inventions, the server may be configured to detect presence or absence of occurrence of the predetermined event associated with each of the construction machines on a basis of images captured by cameras mounted on each of the plurality of construction machines or a camera located at a work site for each of the plurality of construction machines (sixth invention).

With this configuration, the presence or absence of occurrence of various events can be detected by detecting the presence or absence of the occurrence of the event on the basis of the images captured by the above-described cameras. In the remote control system, the above-described cameras are generally provided such that the operator or the supervisor at the work site can confirm the conditions of the work site and the operation state of the construction machine to be controlled, and therefore the system does not need to have a new sensor for detecting the occurrence of event.

The invention claimed is:

1. A remote control system for a construction machine including a plurality of construction machines, a machine control device for selectively and remotely operating the selected construction machines among the plurality of construction machines, and a server having mutual communication function with each of the plurality of construction machines and the machine control device, the remote control system further comprising:
    a database held by the server, wherein the database retains event information defining an occurrence of an event which becomes a trigger of starting to manipulate one of the construction machines or a trigger of switching a manipulation of one construction machine to another construction machine;
    a communication terminal which is capable of registering to the database, based on an input operation by an operator or a relevant person, the event information related to a work to be performed by the operator by manipulating the construction machine; and
    a reporting device provided in the machine control device or held by the operator of the machine control device, configured to output report information to the operator according to an instruction from the server,
    wherein the server detects presence or absence of the occurrence of the event which becomes the trigger of starting to manipulate one of the construction machines or the
    trigger of switching the manipulation of one construction machine to another construction machine, by at least one of acquiring a captured image captured by on-site installation cameras each provided at a work site of the plurality of construction machines or machine mounted cameras installed in each of the plurality of construction machines, receiving from the communication terminal a predetermined input operation provided by a supervisor or the like at the work site, or detecting that an actual time point reaches a time point ahead of a start time point of the work by a predetermined period of time, to compare the captured image, the predetermined input operation received from the communication terminal, or the actual time point detected with the event information retained in the database, wherein the server transmits to the reporting device report information indicating the occurrence of the event which becomes the trigger of starting to manipulate one of the construction machines or the trigger of switching the manipulation of one construction machine to another construction machine and then the reporting device outputs the report information, wherein the communication terminal is capable of setting to the database of the server a priority level of the event information of a machine manipulation start of a corresponding construction machine in addition to the event information, based on the input operation, and wherein, with respect to any one of the plurality of construction machines, the server is configured to further have a function of, when detecting the presence of the occurrence of the event associated with the construction machine, recognizing the priority level of the event associated with the construction machine by checking the database and executing different operations of the construction machine in response to the priority level of the event associated with the construction machine, and wherein, when the priority level set to the event is high, execute start processing of an engine of the construction machine associated with the event and, when the priority level set to the event is low, turn only a main switch of the construction machine associated with the event without starting the engine.

2. The remote control system for a construction machine according to claim 1, wherein with respect to any one of the plurality of construction machines, the server is configured to further have a function of, when detecting the presence of the occurrence of the event which becomes the trigger of starting to manipulate one of the construction machines or the trigger of switching the manipulation of one construction machine to another construction machine associated with the construction machine, executing activation processing of the construction machine associated with the event.

3. The remote control system for a construction machine according to claim 1, wherein the communication terminal is capable of setting a priority level of a machine manipulation start of a corresponding construction machine in addition to the event information, based on the input operation associated with each of the plurality of construction machines, and with respect to any one of the plurality of construction machines, the server is configured to, when detecting the presence of the occurrence of the event associated with the construction machine, vary an output form of the report information from the reporting device according to the priority level set to the event.

* * * * *